United States Patent
Vikutan et al.

(10) Patent No.: US 9,507,698 B2
(45) Date of Patent: Nov. 29, 2016

(54) TEST CODE GENERATION BASED ON TEST DOCUMENTATION

(75) Inventors: Gene Vikutan, San Jose, CA (US); Deepak Thippeswamy, Karnataka (IN); Sunita Solanki, Karnataka (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 250 days.

(21) Appl. No.: 13/489,688

(22) Filed: Jun. 6, 2012

(65) Prior Publication Data

US 2013/0332905 A1  Dec. 12, 2013

(51) Int. Cl.
*G06F 11/00* (2006.01)
*G06F 11/36* (2006.01)

(52) U.S. Cl.
CPC ................................ *G06F 11/3684* (2013.01)

(58) Field of Classification Search
None
See application file for complete search history.

(56) References Cited

U.S. PATENT DOCUMENTS

| | | | | |
|---|---|---|---|---|
| 6,898,784 B1 * | 5/2005 | Kossatchev | ......... | G06F 11/3684 714/E11.208 |
| 7,210,066 B2 * | 4/2007 | Mandava | ............ | G06F 11/3676 714/38.14 |
| 7,219,279 B2 | 5/2007 | Chandra | | |
| 7,913,230 B2 | 3/2011 | Vikutan | | |
| 8,510,716 B1 * | 8/2013 | Jakubiak | ............. | G06F 11/3672 714/45 |
| 2006/0184918 A1 * | 8/2006 | Rosaria et al. | ................ | 717/124 |
| 2006/0271920 A1 * | 11/2006 | Abouelsaadat | ....... | G06F 9/4448 717/137 |
| 2013/0014084 A1 * | 1/2013 | Sahibzada | ............. | G06F 11/368 717/124 |
| 2013/0060507 A1 * | 3/2013 | Kianovski | ........... | G06F 11/3684 702/123 |

OTHER PUBLICATIONS

W3, Global Structure of an HTML document (www.w3.org/TR/REC-html40-971218/struct/global.html) and in view of XPath, W3C Recommendation, Nov. 1999 (http://www.w3.org/TR/xpath).*
W3, Global Structure of an HTML document (www.w3.org/TR/REC-html40-971218/struct/global.html).*

* cited by examiner

*Primary Examiner* — Brian W Wathen
*Assistant Examiner* — Deric Ortiz
(74) *Attorney, Agent, or Firm* — Kraguljac Law Group, LLC

(57) ABSTRACT

Systems, methods, and other embodiments associated with test code generation based on test documentation are described. In one embodiment, a method includes identifying a tagged test action object in a test specification document; mapping the identified test action object to an executable test instruction; and providing the executable test instruction for execution to test an application through a user interface associated with the application. The example method may also include storing executable test instructions as an executable test routine, validating test routines to confirm the presence of specified test instructions, and logging execution of the test instructions.

18 Claims, 9 Drawing Sheets

TEST CODE GENERATION BASED ON TEST DOCUMENTATION

BACKGROUND

The development of a Web application includes validation of the application by way testing that is performed through the application's user interface. Test cases are developed that reflect the quality assurance standards for the application. The test cases are initially performed manually through the application interface. Once the application's user interface is considered stable, test automation scripts may be created by recording manual operations that are performed during a test case. The automation scripts can be run repeatedly without needing manual interaction with the interface. Automation scripts may need to be changed when minor changes are made to the application's user interface, increasing the time and expense of application development.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
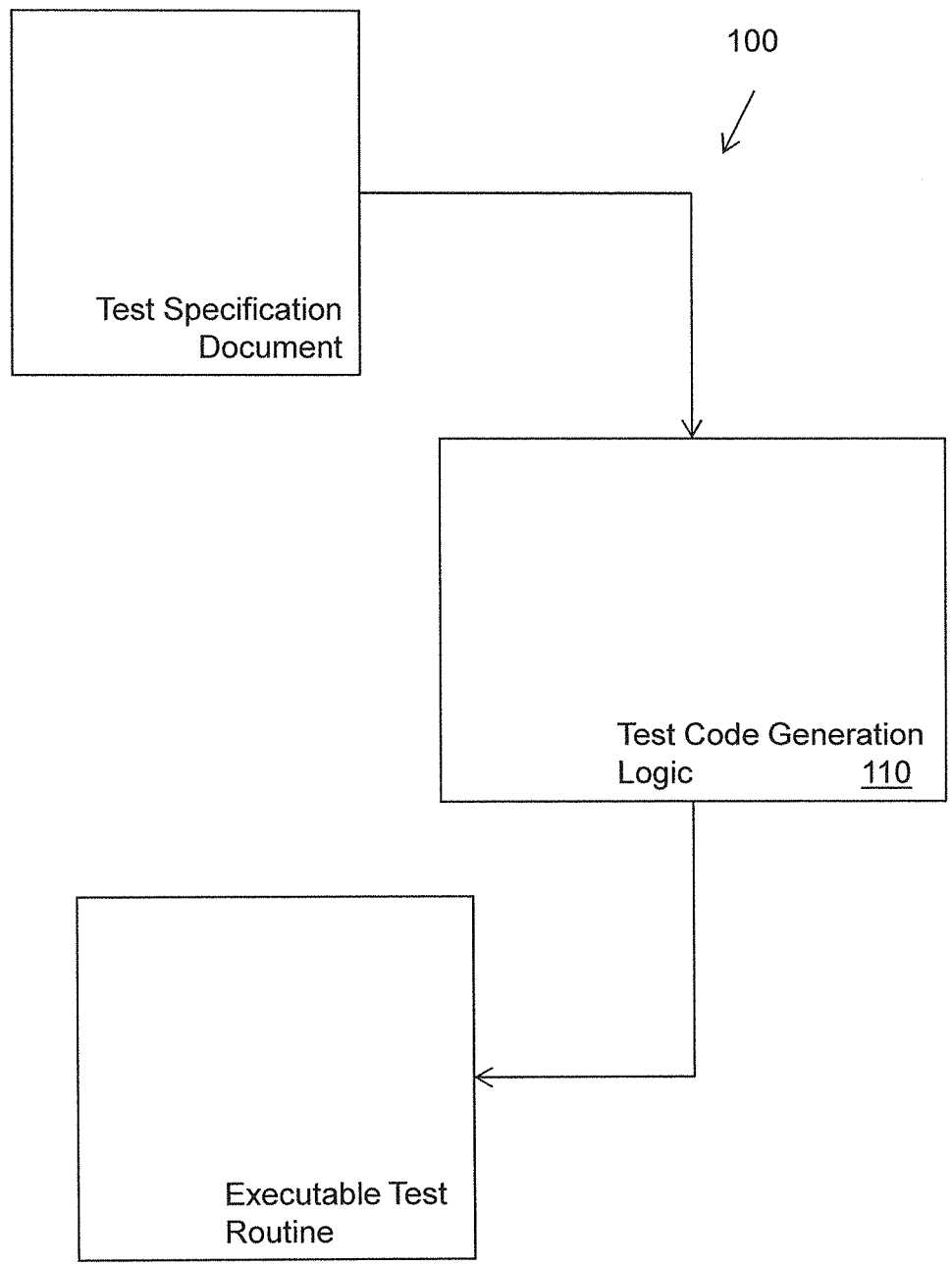
FIG. 1 illustrates one embodiment of a system associated with test code generation based on test documentation.

The typical quality assurance cycle for a web application under development includes creating and executing test cases to verify proper operation of the application through its user interface. The test cases are manually validated by quality assurance personnel as well as product management personnel. The test cases are manually executed through the user interface of the web application. After the application is mature enough that its interface can be considered stable, test automation scripts are recorded during manual operation of the application's user interface. The automation scripts are run repeatedly until a specified level of confidence in the application's functionality is achieved. Often, proof of running the test cases is required for verification purposes. This may entail manually generating screen shots during automated testing.

The test automation scripts are maintained so that they can be re-run when changes are made to the application. If the application's interface has been changed, typically the automation scripts will need to be re-recorded. Changes to hypertext markup language (html) version or web browser version may also necessitate re-recording of automation scripts. Since automation scripts are bound to the automation tool that was used to record them, they usually cannot be played back on any other tool.

Another drawback to the use of automation scripts for testing applications is the disconnect between quality assurance personnel who create test cases and those who approve the test cases. The management personnel who are tasked with approving the script for application testing are typically not familiar with the scripting languages used to automate the test cases. This makes it difficult for the management personnel to confirm that an automation script accurately reflects quality assurance goals.

In many industries, outside auditors (e.g., government auditors, customer auditors, etc) also confirm the automation scripts. These auditors may not be familiar with all of the various scripting languages, making it difficult for them to efficiently evaluate the automation scripts.

Applications under test that are regularly subjected to audit (e.g., Federal Drug Administration regulated applications) are required to provide a chain of traceability from functional requirements to test cases to automation scripts to actual test results of the automation scripts. This kind of traceability is difficult to achieve when test specification documents and executable test code (e.g., automation scripts) are created independently and also when manual test execution is conducted independently from automated testing.

Systems and methods are described herein that provide a tool that automatically generates executable test instructions from tagged test action objects in a test specification document. In this manner, executable test instructions are generated directly from test documentation, replacing the normal process of manually creating test cases and then recording manual execution of the test instructions as automation scripts. The tool allows the executable test instructions to be generated independent of the state of an application's user interface, allowing the instructions to be generated earlier in the development process, before the application is considered stable. Further, changes to the user interface will no longer require re-recording of automation scripts.

In some embodiments, the test instructions correspond to script instructions, (e.g. using Java programming language) that are stored as an executable test routine. In other embodiments, the test instructions generated by the tool correspond to instructions recognized by the application under test. In this case, the executable instructions may be provided to the application as they are generated, eliminating the need to store and maintain test code or any kind of compiled executable instruction.

The tool may be capable of locating an actuable object (e.g., button) in a user interface that is associated with a text object in the test specification document that labels the button. The tool associates the actuable object with the text object label and generates executable instructions for actuating the actuable object.

A quality control markup language may be provided that specifies test action objects and maps one or more executable instructions to each test action object. A library for the quality control markup language is provided that stores the test action objects and the corresponding executable instructions. Each test action object may be mapped to executable instructions for several different execution/playback tools. A translation map of test action objects labels in different spoken languages may be provided in the quality control markup language. This enables identification of test action objects in any supported spoken language to be identified and converted to executable test instructions as well as presentation of results of testing in any supported spoken language with the same executable instructions. As executable instructions are added to an application's instruction set corresponding test action objects may be added the quality control markup language.

The tool may also include one or more validation routines that confirm the presence of selected executable test instructions in test routines generated by the tool. The tool may also include logging functionality that logs test results in a specified manner. For example, the tool may generate an executable instruction to store a screen shot for each performance of the test routine in a database or on a remote or local file system. Such logs and screen shots may be automatically mapped to test case documents and used as proof of test execution during an audit.

With reference to FIG. 1, one embodiment of a system 100 associated with generating test code from is illustrated. A test code generation logic 110 is configured to access a test specification document and, based on the document, generate executable test code. Test case documents of many different formats may be processed by the test code generation logic 110, as long as the test case document has been tagged to identify test action objects in the document. For example, a test document generated by a word processor may present a bullet list of test steps that should be performed to test an application. Test action objects in the test document are tagged with a predetermined identifier (e.g., an "@" symbol in the present description). The test document may be in any spoken language that is supported by the test code generation tool, as will be described in more detail below.

The test code generation logic 110 generates an executable test routine includes executable instructions for each tagged test action object. Test action objects include links, text boxes, radio buttons, images, image buttons, dropdown boxes, text, keystrokes, tables, checkboxes, menus, and so on. For the purposes of this description, an actuable object is a test action object that is actuated by clicking on it. Examples of actuable objects include buttons, radio buttons, dropdown boxes, and so on. Actuable objects typically have some sort of label text associated with them that can be used to distinguish them from one another.

Executable instructions for a given test action object will vary depending on the tool being used to perform the test on the application. Some execution/playback tools that may be used to perform the executable instructions include Oracle Applications Test Suite (OATS), Selenium, and JUnit. Executable instructions for one or more of these tools may be generated by the test code generation logic 110 for each test action object. The executable test code may also include executable instructions for storing results of the execution of the test code as will be described in more detail below.

Figure 2:
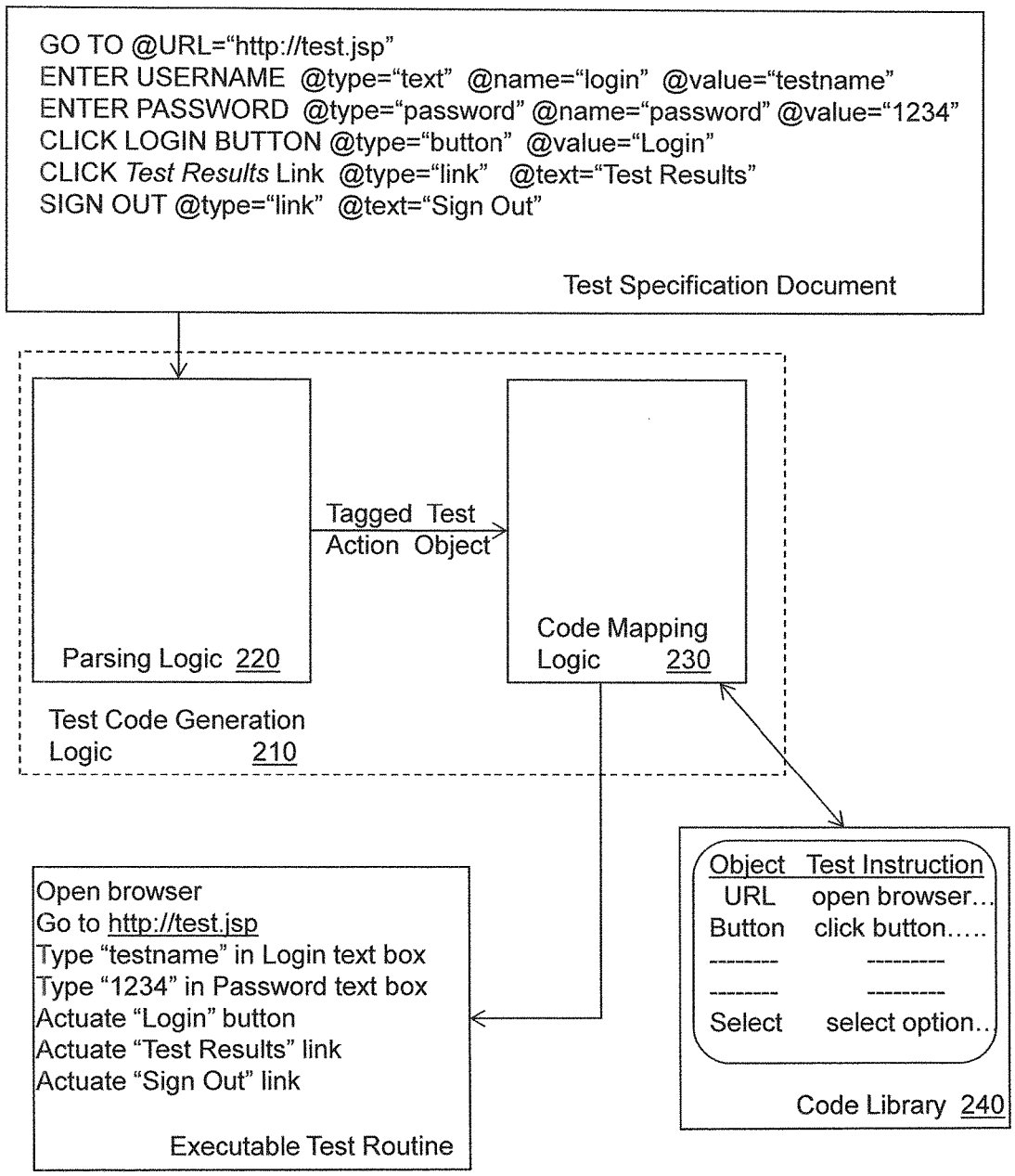
FIG. 2 illustrates another embodiment of a system associated with test code generation based on test documentation.

FIG. 2 illustrates one example embodiment of a test code generation logic 210 that is processing a test specification document. The test specification document includes several test steps written in English. In the described embodiment, test action objects are tagged with an "@" symbol. Other tagging conventions could be used. In the example of FIG. 2, the first test step includes the tagged test action item "URL", the second test step includes the tagged test action objects that together correspond to "login text" with a value of "testname."

The test code generation logic 210 includes a parsing logic 220 that is configured to parse the test specification document and identify the tagged test action objects. The parsing logic 220 provides identified test action objects to a code mapping logic 230. The code mapping logic 230 is configured to access a code library 240 to map executable instructions to the test action objects. The code library 240 is constructed according to the quality control mark up language conventions. The quality control mark up language specifies attributes that are supported for each test action object type.

Using the code library 240, the code mapping logic 230 maps test action objects to executable instructions that, when executed, will perform the test action. For example, in FIG. 2, the test action object "URL" is mapped to instructions to open a browser and go to the website specified by the test action object. The test action "button" is mapped to executable instructions for clicking an interface button.

The code library 240 may include executable instructions for several different playback or execution tools. The mapping logic 230 selects the executable instruction for the intended playback tool, which may be an instruction belonging to the application being tested or in a scripting language. The executable instructions retrieved by the code mapping logic 230 are provided as an executable test routine. The executable instructions "Open browser" and "Go to http://test.jsp" correspond to the tagged test action object "URL=http://test.jsp." Executable instructions "Type "test name" in the Login text box" correspond to the tagged test action objects "type="text," name="login," value="testname." The code library thus enables the same executable code to be executed by different playback tools, making the playback tools plug-replaceable.

The test action objects "button" and "link" are actuable objects. Executable instructions for actuating or "clicking" the objects are stored in the code library 240. Actuable objects are labeled so that they can be specifically identified. The button object is labeled "Login" and the link object is labeled "Test Results." The executable instructions may include instructions for locating the actuable object on the application's user interface that is associated with a label as will be described in more detail with respect to FIG. 7. The executable test routine may be stored for later use in testing application functionality by way of the application's user interface.

Figure 3:
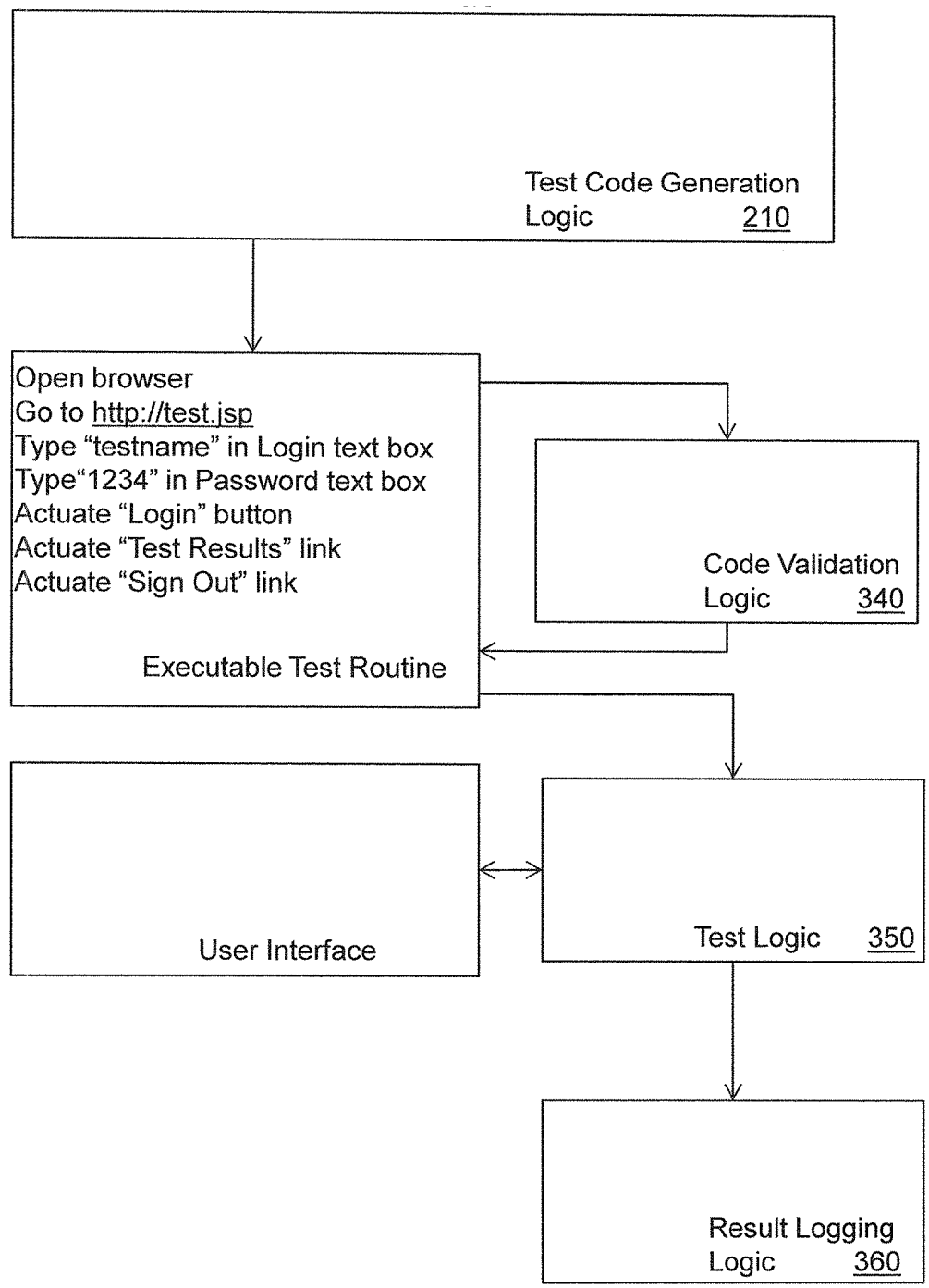
FIG. 3 illustrates one embodiment of a system associated with test code generation based on test documentation.

FIG. 3 illustrates an example embodiment of the test code generation logic 210 that is configured to validate the test routine and to test an application through its user interface. A code validation logic 340 is included with the test code generation logic 210. The code validation logic 340 is configured to validate the test routine with respect to one or more predetermined criteria. For example, the code validation logic 340 may confirm the presence of one or more specified test instructions, such as instructions for logging into and out of the application. Validation rules may be specified in configuration files for the test code generation logic 210. The following configuration file defines a document validation rule that checks that the test routine includes a sign in or login instruction.

```
<rule>
   <id>123</id>
   <name>Rule1</name>
   <description>This rule is to verify the Sign In step. If the step is not
       present, then send Error Message </description>
   <tags> Sign In, Log In</tags>
   <!---On fail throw Error or just a Warning?--->
   <onfail>Warn</onfail>
   <!---errormessage>sign in step missing, checked for @signin or
       @login</errormessage--->
</rule>
```

Once the executable test routine has been validated, the test routine may be stored for later use. A test logic 350 is configured to execute the instructions in the test routine on the user interface of an application being tested. For example, the test routine may be generated in Java code instructions and the resulting test routine may be executed by the test logic 350 as a set of JUnit tests.

The test logic 350 may provide results to a result logging logic 360 that stores a record of the execution of the test routine. The result logging logic may store test results on a local machine, file transfer protocol (FTP) the test results by internet, and/or store the results in a database. The test results may be in the form of screen shots from the application or a log of application output.

Figure 4:
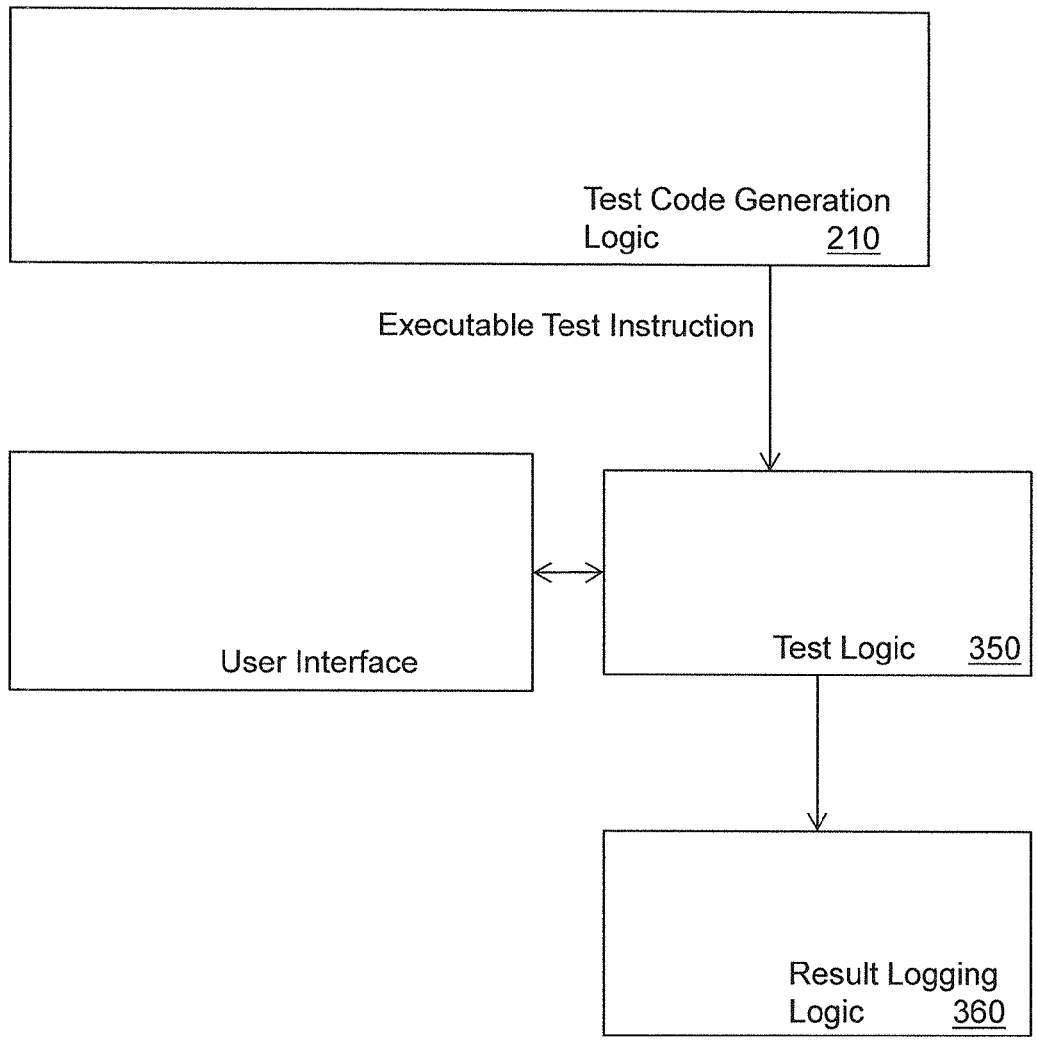
FIG. 4 illustrates another embodiment of a system associated with test code generation based on test documentation.

FIG. 4 illustrates an alternative operation of the test code generation logic 210 and the test logic 350. In the embodiment illustrated in FIG. 4, the executable test instructions generated by the test code generation logic 210 are not stored as a test routine. Instead, the executable test instructions are generated in a format recognized by the application under test. The test logic 350 presents the instructions as they are generated (e.g., "on the fly") to the user interface of the application. The results of the test instructions may be processed by the test logic 350 in the same manner as described with respect to FIG. 3, including logging the test results. This "on-the-fly" approach eliminates the need to store the test routines and to source control test routines. Source control is limited to test documentation.

Figure 5:
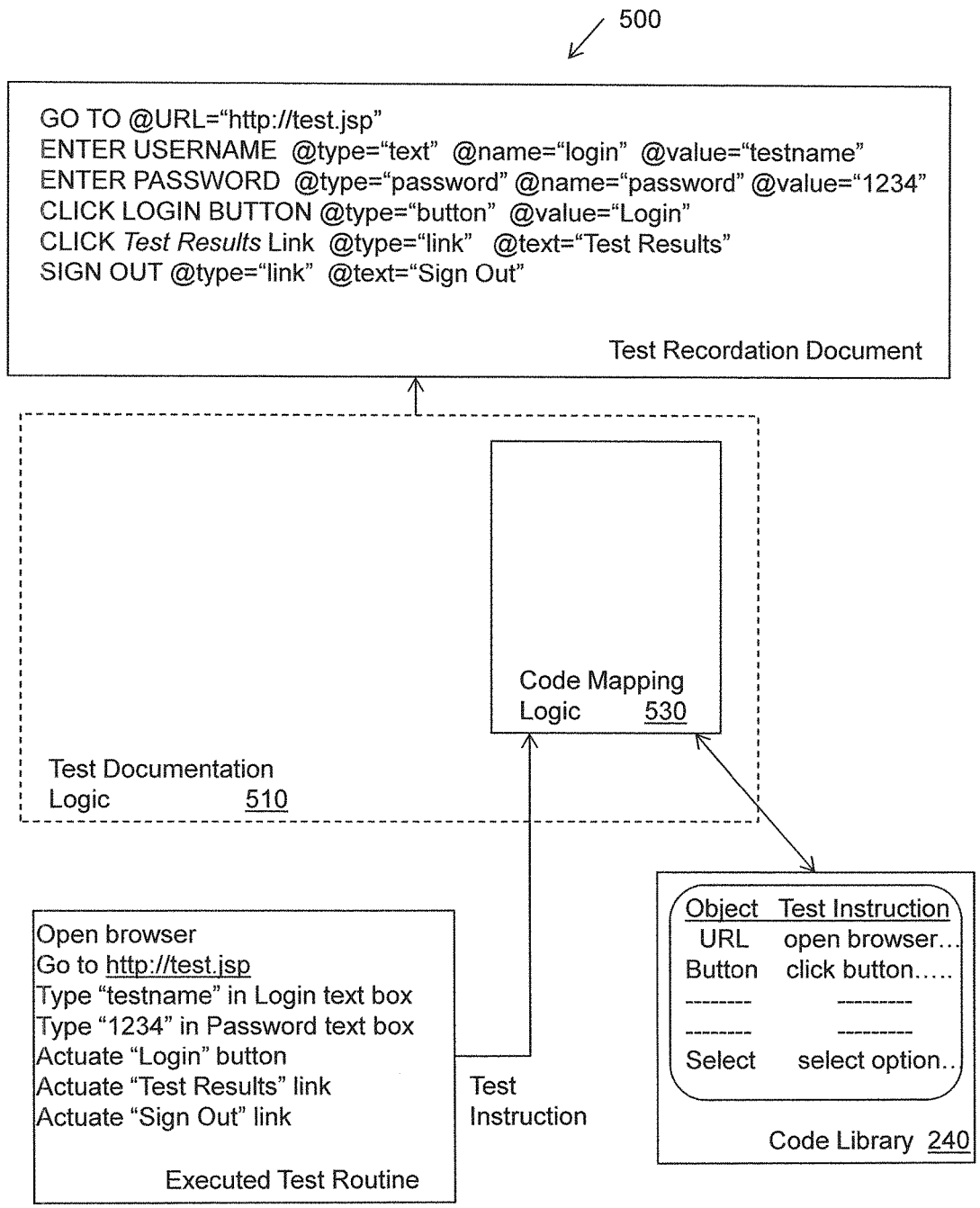
FIG. 5 illustrates one embodiment of an automatic test documentation system that includes a test documentation logic.

FIG. 5 illustrates one embodiment of an automatic test documentation system 500 that includes a test documentation logic 510. The test documentation logic is configured to identify test instructions in an executed test routine. The test documentation logic 510 includes a code mapping logic 530 that accesses the code library 240 to map an identified test instruction with a corresponding test action object. The mapped test action object is recorded in a test recordation document, which will be a human readable record of the test routine.

Figure 6:
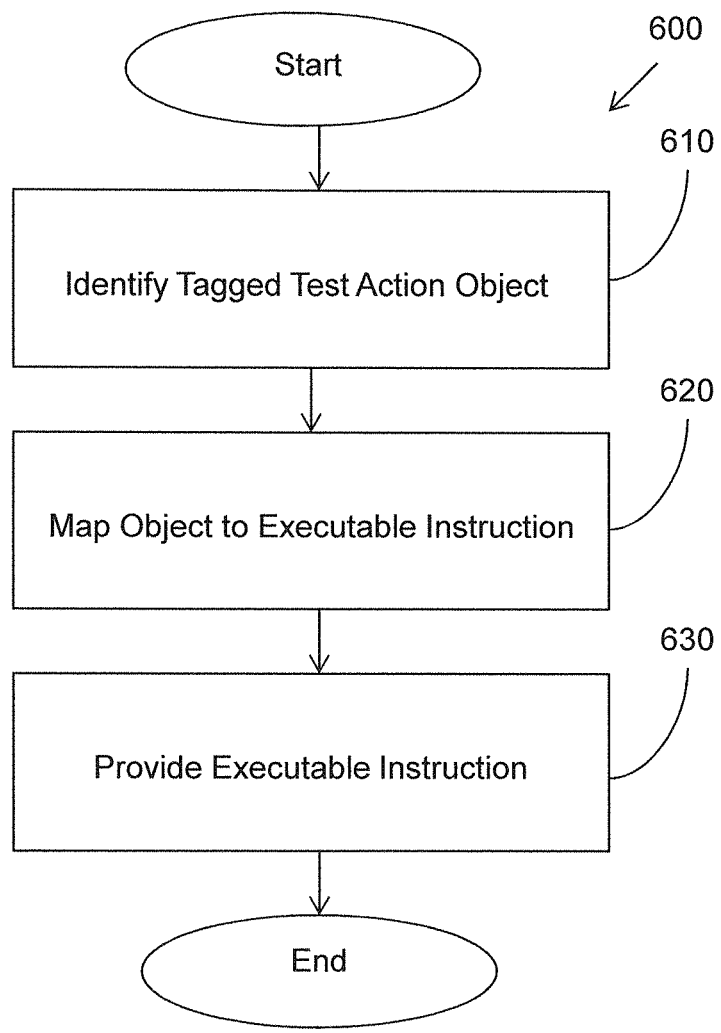
FIG. 6 illustrates an embodiment of a method associated with test code generation based on test documentation.

FIG. 6 outlines one embodiment of a method 600 that may be performed to generate executable test instructions from a test specification document. At 610, the method includes identifying a tagged test action object in a test specification document. At 620, the method includes mapping the identified test action object to an executable test instruction. At 630, the method includes providing the executable test instruction for execution to test an application through a user interface associated with the application.

In one embodiment, the mapping step includes determining an execution/playback tool to be used in testing and accessing a library that maps test action objects to executable test instructions for the determined execution/playback tool. The method may also include providing the executable test instruction to the user interface to test the application. The method may include storing a plurality of executable test instructions as an executable test routine. The test routine can be searched for one or more specified executable test instructions and an error message may be provided if a specified test instruction is not present in the test routine.

In one embodiment, the method includes providing executable instructions for logging test results during execution of the test instruction on the user interface. Logging test results may include generating a screen shot of the user interface during execution of a test instruction on the user interface and/or storing records related to test instruction execution in a database.

In one embodiment, the method includes identifying a preferred spoken language for the tagged text object and accessing a translation map that maps the tagged text object to a translation of the tagged text object in at least one different spoken language. A translation of the tagged text object corresponding to the preferred spoken language is selected and the selected translation is provided as a label for the actuable object.

Figure 7:
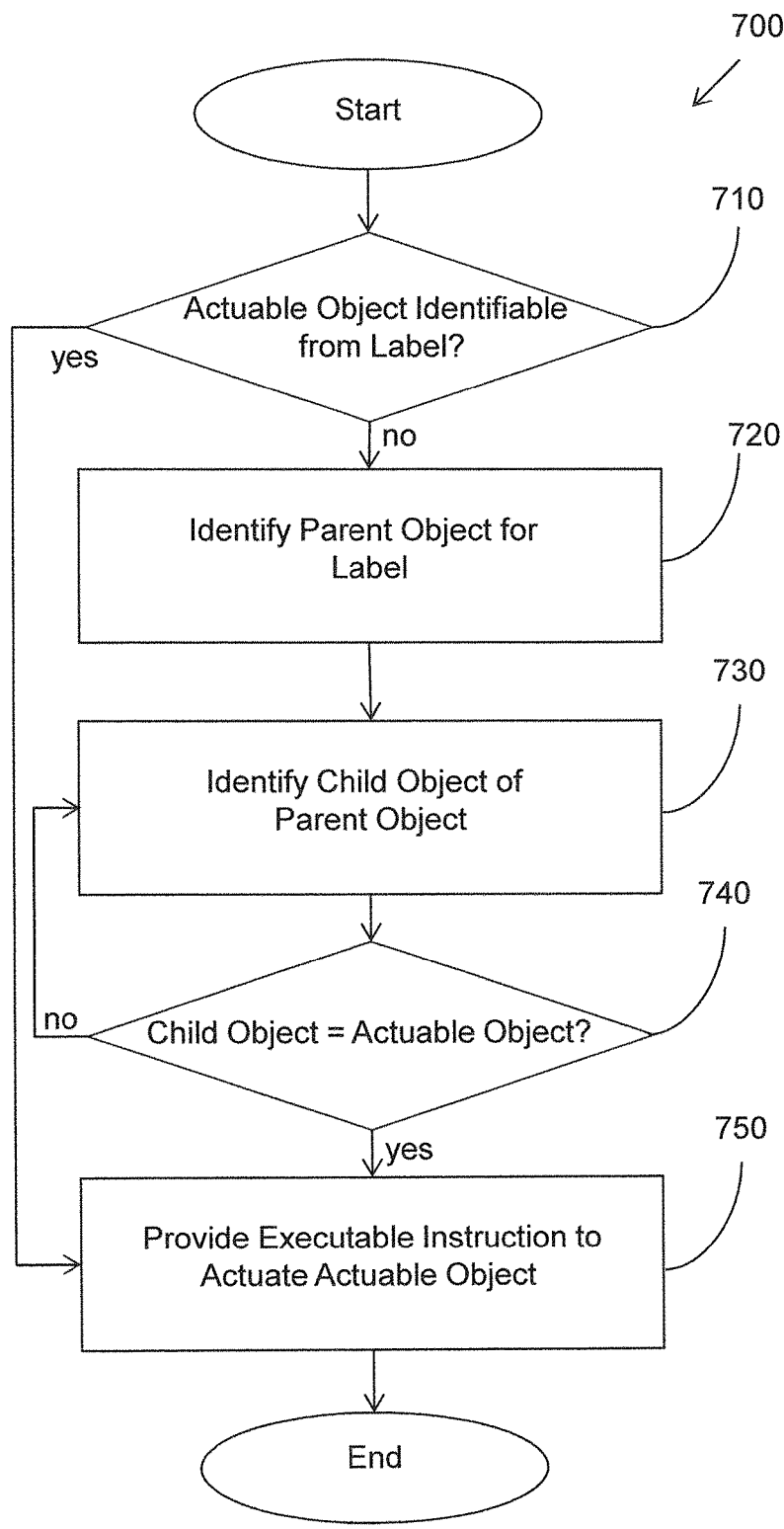
FIG. 7 illustrates another embodiment of a method associated with test code generation based on test documentation.

FIG. 7 illustrates one embodiment of a method 700 that is performed by execution of executable test instructions for locating an actuable object that is identified by a label. Often, a test specification document will have a tagged text object that is identified as a label for an actuable object such as a button or link. However, the particular actuable object on the user interface may not be identified directly by the label text object. In order to properly operate the user interface, executable test instructions are generated that locate the actuable object associated with a text object label. In this manner, even if the specifics of the user interface change, the test instructions will locate the associated actuable object and actuate it.

The method 700 will be described with reference to instructions for interacting with a user interface that is in hypertext markup language (html). Other types of user interfaces may be processed in a similar manner to locate actuable objects. At 710, the method includes determining if a tagged test action object corresponding to a label for an actuable object directly identifies the actuable object. In some cases, the text object and the actuable object are in a single html tag and then the actuable object is identifiable from the label. When the actuable object is identifiable from the label, the method continues at 750 and executable instructions for actuating the actuable object identified directly by the label are provided for use in testing an application through its user interface.

In some cases, the text object label is not in the same html tag as the actuable object, but rather may be included in the same complex html object. To locate the actuable object that is identified by the label, at 720 the method includes determining a parent object to the tagged text object. This determination may be made by executing an XPath query on an XML representation of the complex object. At 730 and 740, the method includes determining if any child object of the parent object corresponds to an actuable object. When a child object is identified as corresponding to an actuable object, the method includes, at 750, executable instructions for actuating the child object are provided for use in testing an application through its user interface.

Figure 8:
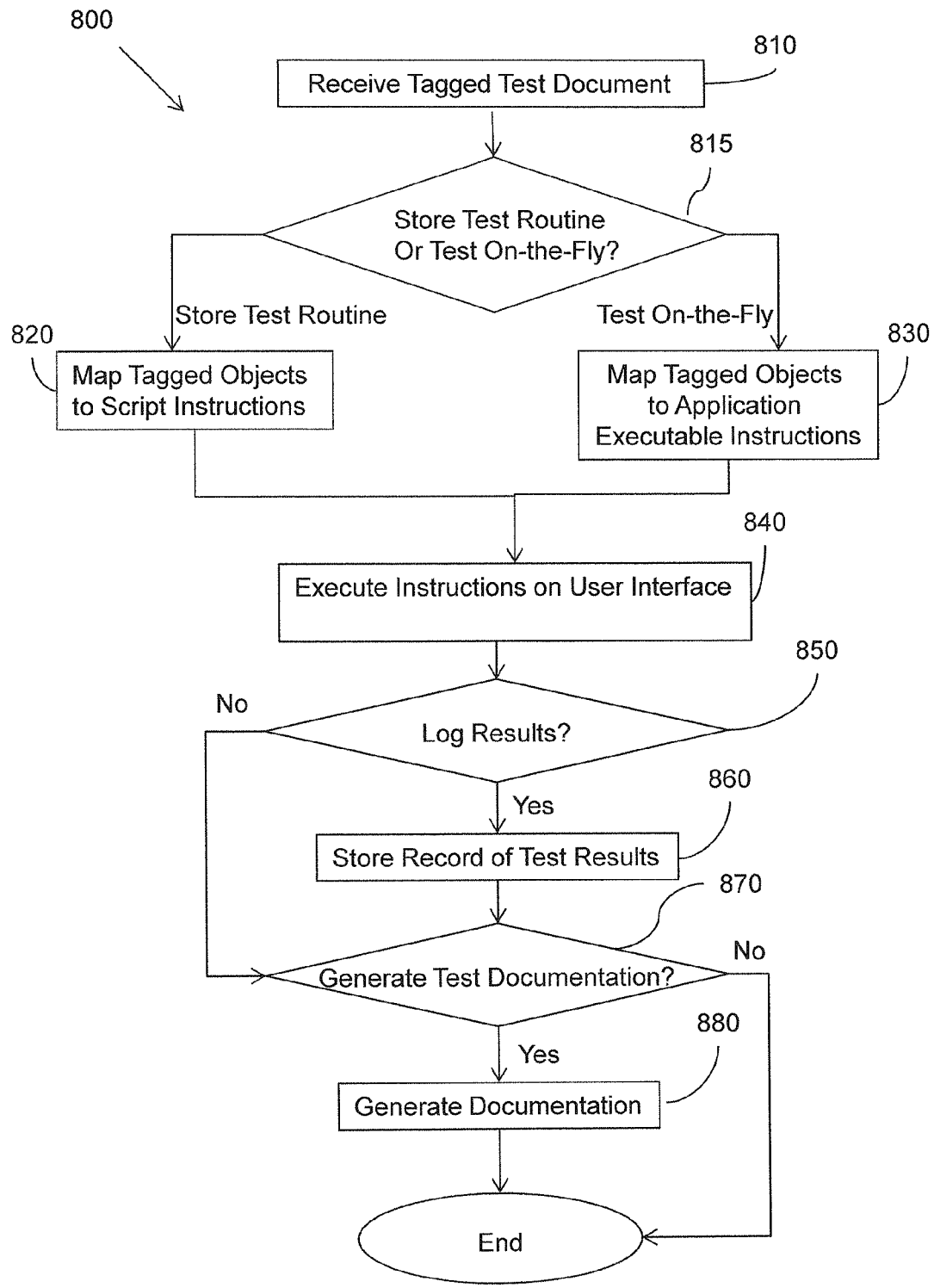
FIG. 8 illustrates another embodiment of a method associated with test code generation based on test documentation.

FIG. 8 illustrates one embodiment of a method 800 for testing applications using the methods and systems described herein. At 810, the method includes receiving a tagged test document. At 815, it is determined whether a test routine is to be stored (see FIG. 3) or if testing is to be performed on the fly (see FIG. 4). If a test routine is to be stored, at 820, tagged test action objects are mapped to Java instructions and stored. If testing is to be done on the fly, at 830 tagged test action objects are mapped to application-executable instructions. At 840, the method includes executing the instructions on the application's user interface.

At 850, the method determines if the results are to be logged. If so, at 860, the method includes storing a record of the test results. At 870, the method determines if test documentation is to be generated from the test instructions. If so, at 880, test documentation is generated by mapping the test instructions to test action objects to produce a human readable record of the test.

General Computer Embodiment

Figure 9:
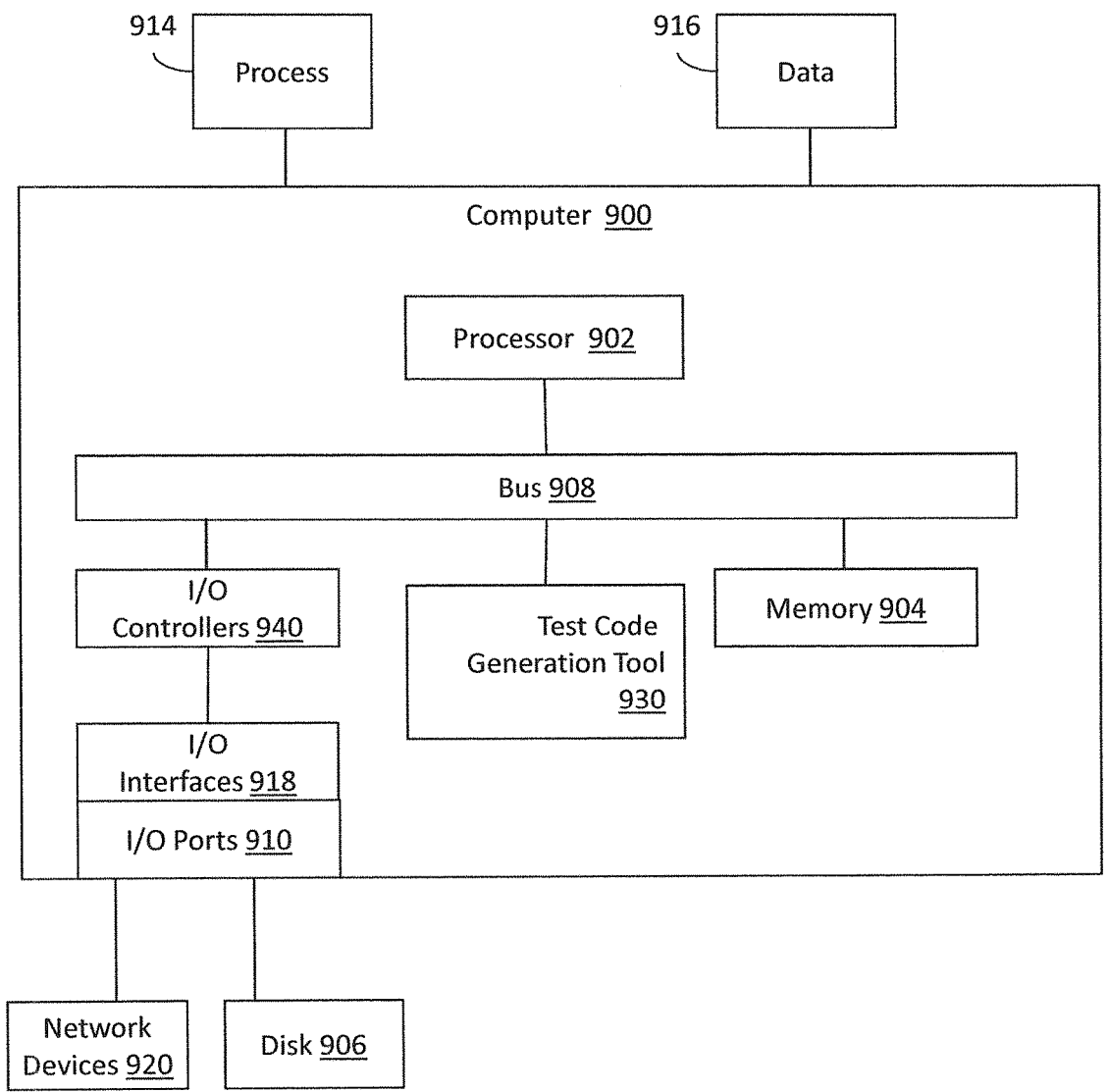
FIG. 9 illustrates an embodiment of a computing system in which example systems and methods, and equivalents, may operate.

FIG. 9 illustrates an example computing device in which example systems and methods described herein, and equivalents, may operate. The example computing device may be a computer 900 that includes a processor 902, a memory 904, and input/output ports 910 operably connected by a bus 908. In one example, the computer 900 may include a test code generation tool 930 configured to facilitate test code generation from test specification documentation. In different examples, the tool 930 may be implemented in hardware, a non-transitory computer-readable medium with stored instructions, firmware, and/or combinations thereof. While the tool 930 is illustrated as a hardware component attached to the bus 908, it is to be appreciated that in one example, the tool 930 could be implemented in the processor 902.

In one embodiment, tool 930 is a means (e.g., hardware, non-transitory computer-readable medium, firmware) for generating executable test instructions from a test specification document.

The means may be implemented, for example, as an ASIC programmed to generate executable test instructions from a test specification document. The means may also be implemented as stored computer executable instructions that are presented to computer 900 as data 916 that are temporarily stored in memory 904 and then executed by processor 902.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The bus 908 may be a single internal bus interconnect architecture and/or other bus or mesh architectures. While a single bus is illustrated, it is to be appreciated that the computer 900 may communicate with various devices, logics, and peripherals using other busses (e.g., PCIE, 1394, USB, Ethernet). The bus 908 can be types including, for example, a memory bus, a memory controller, a peripheral bus, an external bus, a crossbar switch, and/or a local bus.

The computer 900 may interact with input/output devices via the input/output interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the input/output interfaces 918, and/or the input/output ports 910. Through the network devices 920, the computer 900 may interact with a network. Through the network, the computer 900 may be logically connected to remote computers. Networks with which the computer 900 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods described in FIGS. 6-8.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.

OQL: object query language.

USB: universal serial bus.

XML: extensible markup language.

WAN: wide area network.

XLink describes connections between documents. XLink provides an attribute-based syntax for attaching links to documents. XLink provides an XML syntax for describing directed graphs in which the vertices are documents at particular URIs and the edges are links between the documents. A simple link defines a one-way connection between two resources, the source (e.g., starting resource) is the link element while the target (e.g., ending resource) is identified by a URI. XLinks use locators and arcs. Each locator element has an xlink:type attribute associated with the value locator and an xlink:href attribute containing a URI for the resource it locates. Arcs are paths between resources. Linkbases are XML documents that contain inbound or third-party links. A linkbase may establish links from documents other than the linkbase itself.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

XPath is a non-XML language used to identify particular parts of XML documents. XPath indicates nodes by position, relative position, type, content, and so on. XPath expressions may represent numbers, strings, Booleans, and so on. XPath is a language for picking nodes and sets of nodes out of the tree structure that is an XML document.

XPointer uses XPath expressions to identify the particular point in or part of an XML document to which an XLink links. XPointer addresses individual parts of an XML document.

XSL equals extensible stylesheet language. XSL include XSL transformations and XSL formatting objects.

XSLT equals XSL transformations. XSLT is an XML application that specifies rules by which one XML document is transferred into another. XSLT is a general purpose language for transforming one XML document into another for purposes including, for example, web page display. An XSLT stylesheet contains templates that control what output is created from what input. An element has a "match" attribute that contains an XPath pattern identifying the input it matches. XSLT uses XPath expressions to match and select particular elements in an input document for copying into an output document or for further processing.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data on a non-transitory computer readable medium. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Query", as used herein, refers to a semantic construction that facilitates gathering and processing information. A query may be formulated in a database query language (e.g., SQL), an OQL, a natural language, and so on.

"User", as used herein, includes but is not limited to one or more persons, computers or other devices, or combinations of these.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that, when executed by one or more processors of a computing device, cause the computing device to at least:
   receive a test specification document that describes a test used for testing an application, where the test specification document includes one or more tagged objects describing corresponding test actions;
   parse the test specification document to identify the tagged objects;
   validate the test by determining that the test specification document includes one or more predetermined tagged objects, and when the test specification document does not include the one or more predetermined tagged objects, transmit an error message;
   map each tagged object to application-executable test instructions for performing the corresponding test action; and
   perform an application test by providing the application-executable test instructions for execution to a user interface of the application, where the instructions are provided on-the-fly such that the test instructions provided to the user interface are not stored for use in subsequent tests of the application.

2. The non-transitory computer-readable medium of claim 1, wherein the instructions further comprise instructions that, when executed by the one or more processors, cause the computing device to:
   generate application-executable instructions for logging test results during execution of the test instruction on the user interface; and
   include the generated instructions in the instructions provided to the application interface.

3. The non-transitory computer-readable medium of claim 2 where the application executable instructions for logging test results comprise instructions configured to cause the application to generate a screen shot of the user interface during execution of a test instruction on the user interface.

4. The non-transitory computer-readable medium of claim 2 where the application executable instructions for logging test results comprise instructions configured to cause the application to store records related to test instruction execution in a database in a predefined structure.

5. The non-transitory computer-readable medium of claim 2 where the application executable instructions for logging test results comprise instructions configured to cause the application to perform a file transfer protocol of test results to a selected computer.

6. A computing system, comprising:
   a library, stored on non-transitory computer-readable medium, that maps respective test action objects to respective application-executable test instructions that, when provided to a user interface of an application cause the application to perform a corresponding test action;
   test code generation logic configured to:
      receive a test specification document that describes a test for testing the application, where the test specification document includes one or more tagged test action objects,
      parse the test specification document to identify the tagged test action objects,
      validate the test by determining that the test specification document includes one or more predetermined tagged test action objects, and when the test specification document does not include the one or more predetermined tagged objects, transmit an error message, and
      access the library to map each identified tagged test action object to application-executable test instructions for performing the corresponding test action; and
   test code logic configured to test the application by providing the application-executable test instructions to the user interface of the application, where the instructions are provided on-the-fly such that the instructions are not stored for use in subsequent testing of the application.

7. A computer-implemented method, comprising:
   receiving a test specification document that describes a test used for testing an application, where the test specification document includes one or more tagged objects describing corresponding test actions;
   parsing the test specification document to identify the tagged objects;
   validating the test by determining that the test specification document includes one or more predetermined tagged objects, and when the test specification document does not include the one or more predetermined tagged objects, transmit an error message;
   mapping each tagged object to application-executable test instructions for performing the corresponding test action; and
   performing an application test by providing the application-executable test instructions for execution to a user interface of the application, where the instructions are provided on-the-fly such that the test instructions provided to the user interface are not stored for use in subsequent tests of the application.

8. The non-transitory computer-readable medium of claim 1, wherein the instructions further comprise instructions that, when executed by the one or more processors, cause the computing device to:
   access a stored set of executed test instructions;
   map each executed test instruction to a tagged object; and
   record the tagged objects in a test recordation document.

9. The non-transitory computer-readable medium of claim 1, wherein the instructions further comprise instructions that, when executed by the one or more processors, cause the computing device to:
   when the tagged object is a label for an actuable object, locate the actuable object by mapping the tagged object to application executable instructions for:
      determining a parent object to the tagged object;
      determining if any child object of the parent object corresponds to an actuable object; and
      when a child object is identified as corresponding to an actuable object, identifying the child object as the actuable object associated with the tagged object.

10. The computing system of claim 6 where the test code generation logic is further configured to:
    generate application executable instructions for configured to cause the application to generate a screen shot of the user interface during execution of a test instruction on the user interface; and
    include the generated instructions in the instructions provided to the application interface.

11. The computing system of claim 6 further comprising documentation logic configured to:

access a stored set of executed test instructions;
map each executed test instruction to a tagged object; and
record the tagged objects in a test recordation document.

12. The computing system of claim 6 where the test code generation logic is further configured to:
when the tagged object is a label for an actuable object, locate the actuable object by mapping the tagged object to application executable instructions for:
determining a parent object to the tagged object;
determining if any child object of the parent object corresponds to an actuable object; and
when a child object is identified as corresponding to an actuable object, identifying the child object as the actuable object associated with the tagged object.

13. The computer-implemented method of claim 7, further comprising:
generating application executable instructions for logging test results during execution of the test instruction on the user interface; and
including the generated instructions in the instructions provided to the application interface.

14. The computer-implemented method of claim 13 where the application executable instructions for logging test results comprise instructions configured to cause the application to generate a screen shot of the user interface during execution of a test instruction on the user interface.

15. The computer-implemented method of claim 13 where the application executable instructions for logging test results comprise instructions configured to cause the application to store records related to test instruction execution in a database in a predefined structure.

16. The computer-implemented method of claim 13 where the application executable instructions for logging test results comprise instructions configured to cause the application to perform a file transfer protocol of test results to a selected computer.

17. The computer-implemented method of claim 7 further comprising:
accessing a stored set of executed test instructions;
mapping each executed test instruction to a tagged object; and
recording the tagged objects in a test recordation document.

18. The computer-implemented method of claim 7, further comprising:
when the tagged object is a label for an actuable object, locating the actuable object by mapping the tagged object to application executable instructions for:
determining a parent object to the tagged object;
determining if any child object of the parent object corresponds to an actuable object; and
when a child object is identified as corresponding to an actuable object, identifying the child object as the actuable object associated with the tagged object.

* * * * *